C. E. H. ARMBRUSTER.
DYNAMIC OPTOMETER.
APPLICATION FILED AUG. 20, 1917.
1,306,736.
Patented June 17, 1919.
3 SHEETS—SHEET 3.
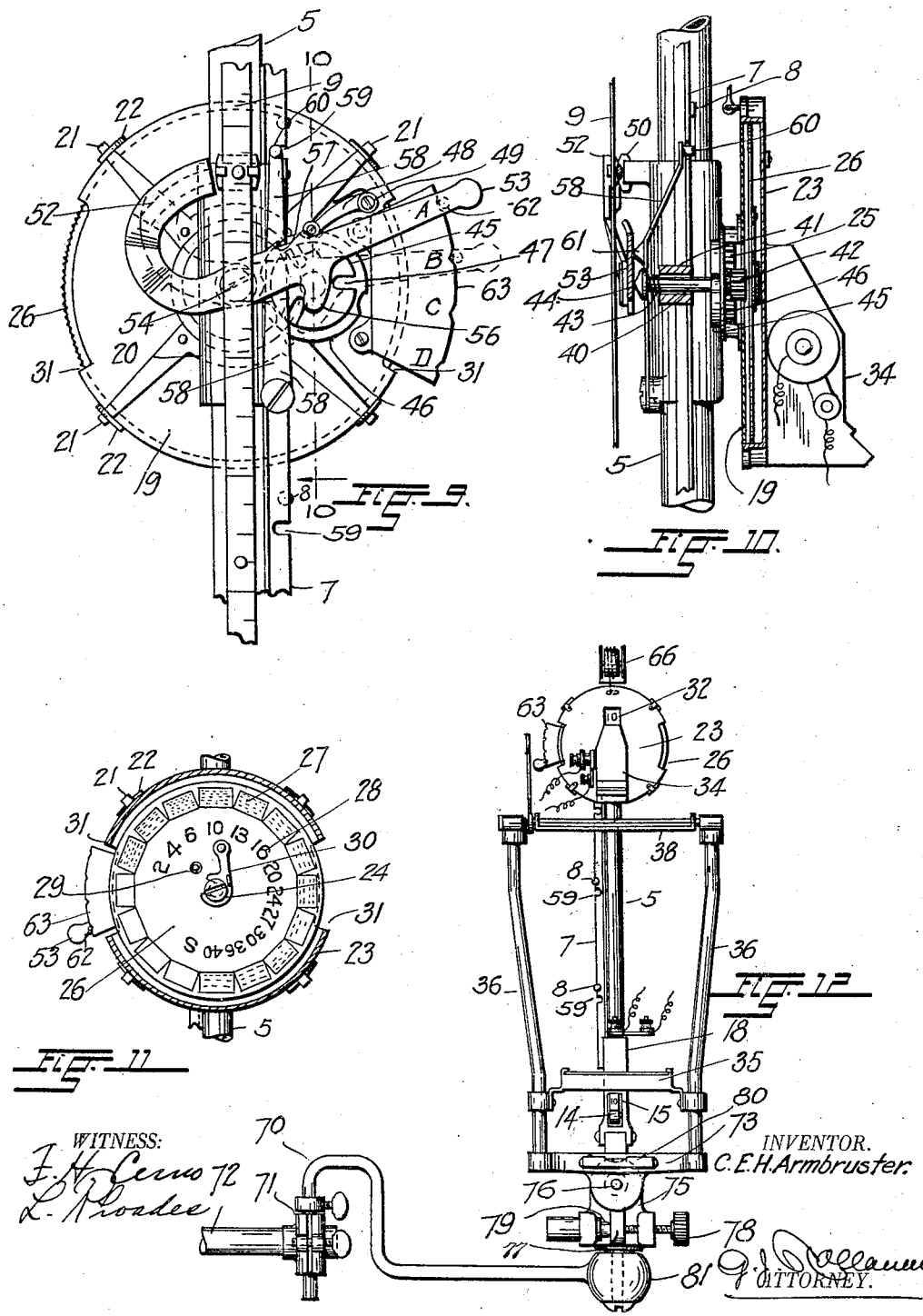
WITNESS:
INVENTOR.
C. E. H. Armbruster.
ATTORNEY.

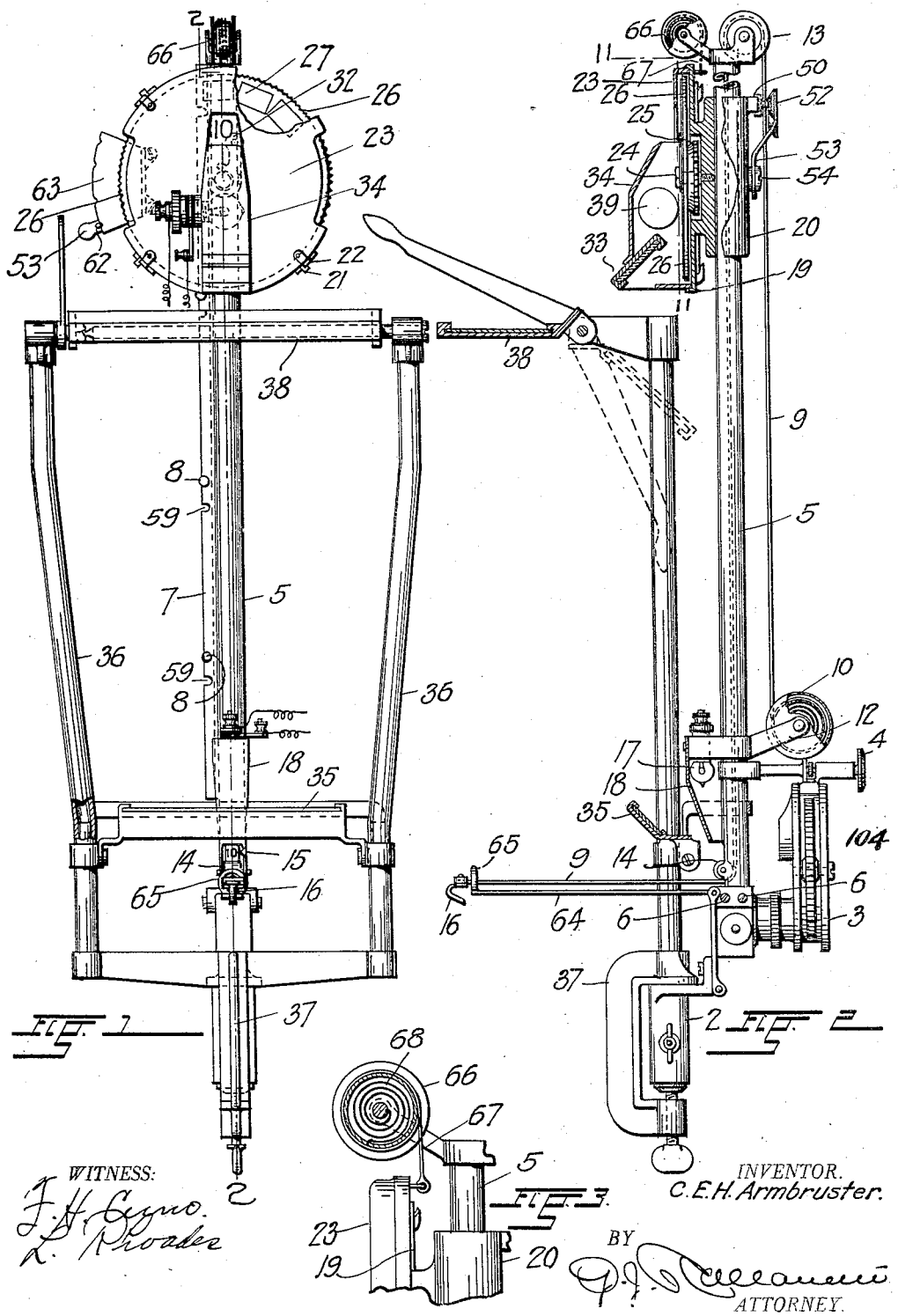

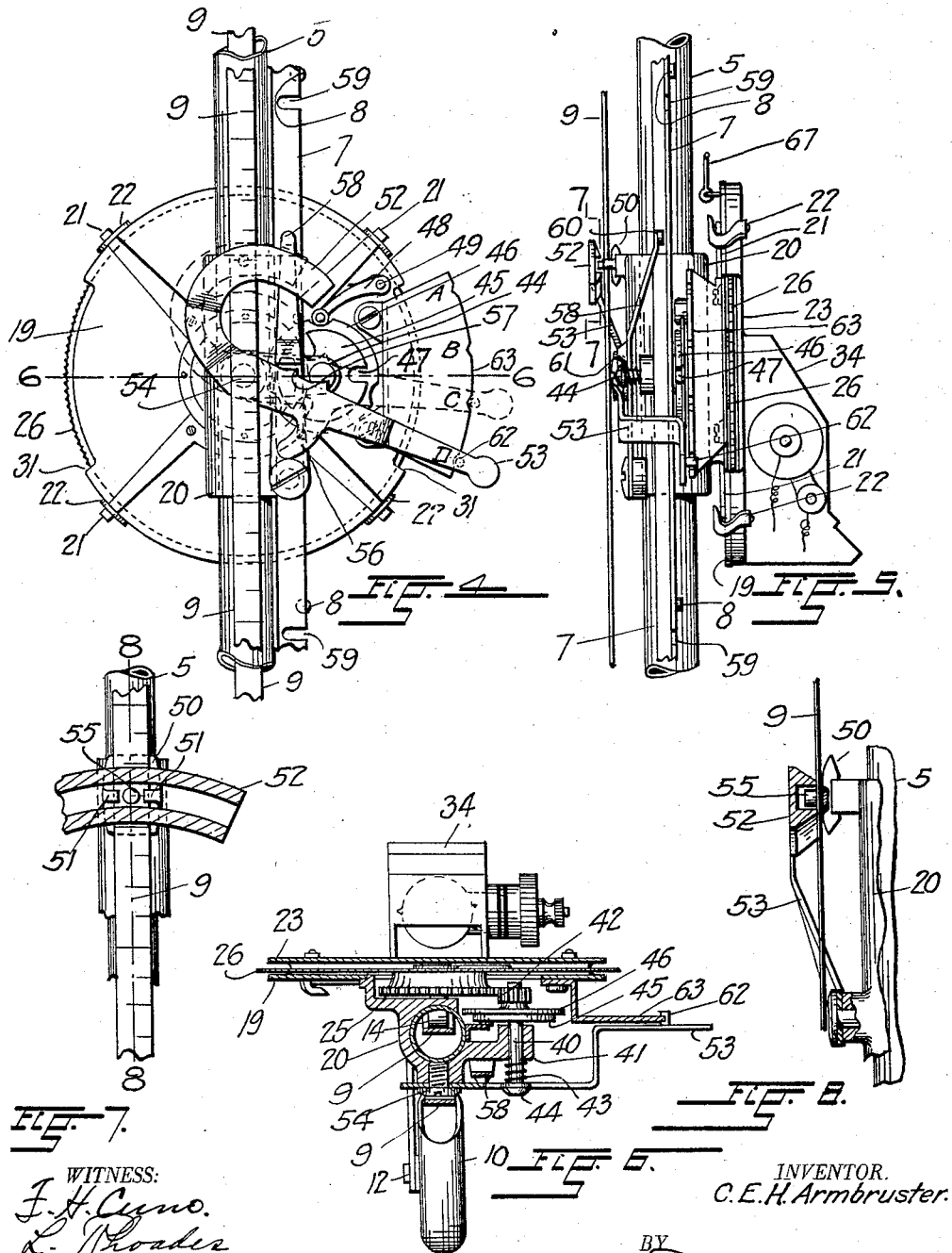

UNITED STATES PATENT OFFICE.

CHARLES E. H. ARMBRUSTER, OF DENVER, COLORADO.

DYNAMIC OPTOMETER.

1,306,736.     Specification of Letters Patent.     Patented June 17, 1919.

Application filed August 20, 1917. Serial No. 187,284.

*To all whom it may concern:*

Be it known that I, CHARLES E. H. ARMBRUSTER, a citizen of the United States, residing at Denver, in the county of Denver and State of Colorado, have invented certain new and useful Improvements in Dynamic Optometers, of which the following is a specification.

My invention relates to improvements in dynamic optometers of the type disclosed in my application for Patent No. 164,497.

In the instrument shown in the prior application, a series of separately movable test-type charts are consecutively exposed to the view of a patient by moving the instrument in the line of vision of the eye or eyes to be examined, after a measuring tape which constitutes the actuative member of the chart moving mechanism of the instrument, has been fastened at a point substantially in a vertical plane with the eyes.

It is the primary object of the present invention to provide in lieu of the series of charts above referred to, a movable element bearing a series of consecutively arranged test-types of graduated sizes and mounted on a carrier in operative association with a mechanism which by a movement of the carrier in a determinate path, imparts an intermittent movement to the element to expose the test-types comprised in the series successively to the view of the patient.

The movement of the carrier is effected by moving the end of a measuring tape toward or from the patient who fixes the eye or eyes upon a mirror which reflects the images of the test-types exposed on the moving carrier.

Other objects of my invention reside in the provision of an adjusting mechanism which operates to either lock the carrier in a selected position and detach it from the actuative tape, or to lock the test-type-bearing element in a selected position on the carrier while the latter moves along its course.

With the above and other objects in view all of which will fully appear in the course of the following description, my improved optometer comprises an upright column which is fixed upon a stationary support and along which the hereinabove referred to carrier is moved by the hoisting action of a measuring tape wound upon a spring-reel mounted adjacent the foot of the column.

A mirror on the moving carrier coöperates with a second mirror fixed adjacent the lower end of the column to present test-types of a series arranged on a rotary disk which is supported on the carrier, to the view of the patient, and a simple mechanism is provided for the operation of the disk by the movement of the carrier, to bring the test-types comprised in the series successively in the field of the mirrors.

The adjusting mechanism hereinbefore referred to is designed to establish the connection of the element with the tape and to control the operation of the mechanism by which the test-type bearing element is rotated during movement of the carrier along the column, and electric lamps are provided to illuminate the test-types and the portion of the tape at which the distance to which its end is removed from the column, is indicated.

An embodiment of my invention in its preferred form has been shown in the accompanying drawings in the various views of which like parts are similarly designated and in which Figure 1 is a face view of my improved optometer in its operative position on a trial-frame bracket.

Fig. 2, a section taken along the line 2—2, Fig. 1,

Fig. 3, an enlarged sectional elevation of the counter-balancing reel at the upper end of the instrument shown in Figs. 1 and 2, Fig. 4, an enlarged rear elevation of the test-type bearing element showing the adjusting mechanism by which its movements are controlled, in different positions, Fig. 5, a side elevation of the mechanism shown in Fig. 4, Fig. 6, a transverse section along the line 6—6, Fig. 4, Fig. 7, an enlarged sectional view of the tape-grip of the instrument, taken along the line 7—7, Fig. 5, Fig. 8, a section along the line 8—8, Fig. 7, Fig. 9, a section similar to that of Fig. 4 showing the adjustable parts of the mechanism in two other positions, Fig. 10, a section taken along the line 10—10, Fig. 9, Fig. 11, a section taken along the line 11—11 Fig. 2 showing the face view of the test-type bearing disk mounted on the carrier of the instrument, and Fig. 12, an elevation showing a modification of the means used for mounting the instrument in its operative position.

Referring first to Figs. 1 and 2 of the drawings, the reference numeral 2 designates a bracket which supports a trial-frame 3 adapted to hold the testing lenses in front of the patient's eyes which have been designated by the numeral 104 in Fig. 2.

The bracket carries a head-rest 4 which determines the proper position of the patient's eyes with relation to the trial frame and is as usual adjustably mounted upon a wall or other convenient stationary support.

An upright, tubular column 5 secured to the trial-frame by the use of screws 6 or other suitable means, has exteriorly, a longitudinally extending rib 7 provided with laterally projecting tappets 8 for the operation of the rotary test-type bearing-member on a carrier which has a sliding movement along the column as will hereinafter be more fully described.

A measuring tape 9 is wound upon a spring-controlled reel 10 which is rotatably mounted in a casing on an arm 12 which projects from the column 5 above the trial-frame 3.

The tape extending from the reel upwardly, exterior of the hollow column, is trained around a sheave 13 at the upper end thereof and thence passes through the column and through an opening at the foot thereof at which it turns around a roller 14 for its movement in a substantially horizontal direction.

Adjacent the opening in the lower end of the column is a pointer 15 which coöperates with the graduations on the tape to indicate the distances at which its end is removed from the eye of the patient.

The tape has at its end a hook 16 by means of which it is attached to the retinoscope or other similar instrument used to examine the eyes of the patient, and an incandescent lamp 17 in a housing 18 fastened to the column above the opening through which the tape extends, is provided to illuminate the portion of the tape which registers with the pointer.

The carrier hereinbefore repeatedly referred to comprises a circular base plate 19 fixed upon a sleeve 20 which is slidably fitted around the column.

The base has a number of radially projecting catches 21 to secure by coöperation with a corresponding number of hooks 22, a cover 23 which incloses the operating mechanism of the carrier at the front thereof.

A headed stud 24 secured in the center of the base 20, supports for rotation a gear-wheel 25 and a therewith connected disk 26, the gear-wheel being disposed in a recess of the base-plate and the disk in close proximity to the face of the same.

The disk which is shown in detail in Fig. 11 bears upon the marginal portion of its face, a series of test-types 27 of graduated sizes which are arranged in a concentric circle and in endless succession.

The disk bears furthermore within the circle of test-types, a concentric sequence of numbers 28 arranged in correspondence with the test-types of the series and provided to identify the same exteriorly of the carrier for the purpose of indicating to the operator which one of the series of test-types is being exposed to the view of the patient.

A pin 29 on the gear wheel 25 connects the test-type-bearing disk for rotation therewith, and a pivoted latch 30 which embraces the stud 24 rearward of its head as shown in Fig. 11, secures the disk in its operative position on the carrier.

The cover 23 is provided with a rim by which it is held in spaced relation to the base-plate 19 and it has in its said rim opposite openings 31 to afford access to the milled edge of the disk 26 when it is desired to rotate the same by hand.

The cover has, furthermore, an opening 32 the upper portion of which registers with the circular series of identification numbers 28 to separately expose them at the front of the carrier, and the lower part of which exposes the test-types 27 for their reflection in a mirror 33.

The mirror is secured in a slanting position within an open-ended hood 34 which covers the portion of the opening below that through which the numbers 28 are exposed.

A second mirror 35 parallel to the one within the hood is mounted adjacent the foot of the column between two uprights of a standard 36 which is rigidly secured to the trial-frame bracket by means of a clamp 37.

It is within the lower mirror that the patient seated opposite the trial frame and gazing at opposite sides past the column 5, sees the reflection of the test-type which registers with the sight opening in the cover of the mirror.

The standard 36 carries at its upper end an adjustable mirror 38 which when placed in a position parallel to the lower mirror as shown in broken lines in Fig. 2, adapts the instrument for use as a reflectoscope of the type disclosed in my United States Letters-Patent No. 1,190,619.

An incandescent lamp 39 disposed within the open-ended hood 34 is provided to illuminate the test-type and the numbers exposed through the sight-opening 32.

A transmission member which in the operation of the instrument serves to convert a longitudinal movement of the tape along the column into an intermittent rotary movement of the test-type bearing-disk, comprises a spindle 40 which is rotatably and longitudinally movably supported in a bearing 41 formed integrally with the sleeve 20.

A pinion 42 at the end of the spindle 40 meshes with the gear-wheel 25 and a spring 43 between a head 44 at the opposite end of the spindle, and the corresponding side of the bearing 41, serves to yieldingly hold the cam-wheel 45 for engagement with the tappets 8.

A cam-wheel 45 mounted on the spindle 40 has a plurality of equidistant peripheral notches 47 to admit the before-mentioned tappets 8 which project laterally from a side of the rib 7 on the column 5.

A flange 46 on the cam-wheel has peripheral indentations which are positioned in correspondence with the notches 47 to receive a roller at the end of a spring-pressed arm 48 which is pivoted on the base-plate of the carrier as at 49.

It is the purpose of this roller to frictionally restrict the movement of the cam-wheel and prevent its rotation through an arc greater than that required to move the disk 26 for the consecutive registration of the test-types 27 with the sight-opening 32.

The sleeve 20 by which the carrier is slidably mounted upon the column 5 carries a grip adapted to secure the carrier to the portion of the tape which moves exteriorly of the column.

The grip consists of a stationary member 50 which has forwardly projecting prongs 51 at opposite sides of the tape 9, and a segmental member 52 at the end of a lever 53 which is pivoted upon the sleeve as at 54.

The segmental member of the grip has a longitudinal groove adapted to admit the prongs 51 and the tape 9 carries a button 55 which enters between the prongs of the one member of the grip and within the groove of the other member of the same so that when the parts of the grip are in their coöperative position they will securely fasten the carrier to the tape.

The connection between the segmental arm 52 and the part of the lever by which it is mounted upon the pivot on the sleeve 20, is resilient and the edges of the arm at opposite sides of its slot are beveled as best shown in Fig. 8 of the drawings, so that the button 55 on the tape will automatically enter the groove by a momentary deflection of the segmental arm when during longitudinal movement of the portion of the tape to which it is attached it is brought in contact with one or the other of the beveled edges of the same.

The lever 53 has opposite to its segmental arm a handle by means of which it is turned about its pivot and it carries between its said pivot and its said handle a cam 56 for the adjustment of the transmission member hereinbefore referred to, and a second cam 57 for the operation of a resilient latch 58 which serves to lock the carrier in any one of a plurality of predetermined positions on the column by coöperation with notches 59 in the edge of the rib 7.

The latch consists of a flat spring which is fastened at one of its ends to an arm projecting on the sliding sleeve of the carrier and which at its free end has a projection 60 adapted to enter the notches of the rib.

The latch is normally separated from the face of the rib by its inherent resiliency, and it is pressed against the same for the purpose of permitting its projection to enter one of the notches 59, only when engaged by the cam 57 on the adjusting lever which controls the mechanism by which the test-type bearing-element is operated.

To insure the actuative engagement of the cam 57 on the lever with the spring latch 58, the latter has upon its outer surface a beveled hump 61 which is engaged by the cam when the lever is moved about its pivot.

The cam 56 on the lever serves to move the spindle 40 of the transmission member longitudinally against the pressure of the spring 43 to move the cam-wheel 45 out of the plane of the tappets 8 on the rib 7 and thereby permit of a movement of the carrier along the column without rotation of the test-type bearing-disk which is operatively connected with the pinion of the transmission member by the gear-wheel 25.

The positions of the lever in which it performs the different adjustments hereinbefore enumerated, are determined by the registration of a roller-detent 62 on its handle, with notches in a segment 63 which is fastened to the base-plate of the carrier.

The notches have been designated on the drawings by the letters A, B, C and D.

It will be observed by contemplation of Fig. 4 of the drawings that when the detent of the lever is in the notch D, the cams 56 and 57 are free from the parts with which they coöperate for the adjustment of the mechanism, while the two members 50 and 52 of the grip are in their coöperative relation to secure the button 55 on the tape 9.

With the parts thus positioned, the carrier may freely move along the column when the tape is unwound from the reel by outward movement of its end at which the hook 16 is attached, or rewound by the action of the spring which connects the reel with the axle upon which it is rotatably supported.

Each time one of the tappets on the rib enters one of the notches on the cam disk it imparts a partial rotation thereto and through the medium of the pinion and the gear-wheel, causes a corresponding movement of the disk 26 to advance the test-type next succeeding that which registered with the sight opening 32, into the place thereof.

The patient seated behind the trial-frame sees the reflection of the exposed test-type in the lower one of the two mirrors and the operator who pulls the end of the tape in a horizontal direction away from the foot of the column, ascertains by the position of the graduations on the tape relative to the pointer 15, the distances from the eyes of the patient at which the different test-types are exposed to the view thereof, it being understood that the distance between the two mirrors varies in accordance with the distance to which the end of the tape is removed from the eye.

To prevent errors in the measurement by lateral displacement of the tape when it is pulled away from the instrument, an arm 64 is provided, which projects forwardly from the foot of the column and which carries at its end a loop 65 to guide the tape during its longitudinal movement.

The weight of the sliding element which carries the test-type disk and the therewith associated parts of the mechanism, is counterbalanced by a spring-actuated rotary reel 66 mounted at the upper end of the column 5.

A band or cord 67 wound upon the reel 66 connects with the base-plate of the carrier, and a spring 68 is arranged within the reel, as shown in Fig. 3, to assist the upward movement of the carrier along the column and thereby facilitate the outward movement of the tape.

As in the instrument described in the above-referred to application for patent, the test-types 27 which are displayed at distances from the eye of the patient determined by the position of the tappets on the rib of the column, are proportioned in accordance with the lines subtending the normal visual angle of the eye at corresponding distances from the vertex thereof, and the punctum proximum or approximate focusing point of the eye is thus determined either by the use of a retinoscope attached to the hook 16 at the end of the measuring tape as in the objective test, or by statements of the patient as to the clearness of the types exposed to his view in the lower mirror, as in the subjective test.

After the punctum proximum has been established, the operator locks the carrier against movement along the column, by moving the lever 53 successively to the positions determined by the registration of its detent with the notches B and A as shown in Fig. 9, which brings the cams 56 and 57 into contact respectively with the head 44 of the spindle 40 of the transmission mechanism and the hump 61 on the spring-latch 58, and thereby compels the latter to enter the nearest notch on the rib 7 while the cam-wheel 45 is moved out of alinement with the tappets on the same.

The grooved segment 52 is in this position of the lever separated from the fixed member 50 of the grip and thereby unlocks the carrier from the tape.

The measuring tape being thus free to be moved independent of the carrier, may now be employed to measure the lag or in some cases the overaccommodation of the eyes for the purpose of ascertaining their correct power of accommodation, or to measure other distances in tests in which the services of the test-types are not required.

When it is desired to have the patient view any one of the test-types on the disk at varying distances, the transmission member is placed in an inoperative or idle condition by moving the lever 53 to the position determined by the notch C (Fig. 4 of the drawings) in which the carrier is connected with the tape as before, the cam 56 engages the spindle 40 and the cam 57 is disengaged from the latch 58.

The carrier may now be moved along the column without changing the position of the exposed test-type with relation to the sight-opening 32, which is of particular value when it is desired to ascertain the patient's ability to suppress the accommodation of focusing power of the eyes.

It will be understood that under all conditions the disk 26 may be rotated by hand to any desired position by pressure upon its milled edge which protrudes through the openings 31 in the rim of the cover 19.

The adjustment of the lever 53 to the position designated by the letter B (see Fig. 9), brings the cam 56 in engagement with the spindle 40 and the cam 57 in contact with the spring latch 58 while the carrier remains connected with the tape.

Both the tape and the carrier are thus locked against further movement, a condition which is of value when it is desired to fix the distances to which the retinoscope at the end of the tape and the reflection of the particular test-type of the series on the disk have been moved with relation to the eyes of the patient.

An advantage of the present instrument over other instruments of the same type is that one tape will suffice to measure the position of the test-types with relation to the eye, as well as the lag or over-accommodation, and another advantage resides in the fact that the sliding movement of the carrier along the stationary column prevents the vibration or changing of position which is unavoidable when the instrument is held in the hand of the operator or mounted upon an extensible bracket.

The method of using the instrument as a reflectoscope when the mirror 38 has been moved to the position shown in broken lines in Fig. 2, is identical to that in which the device disclosed in the before-mentioned Letters-Patent is employed.

In the modified form of the instrument, shown in Fig. 12, the column 5 and the standard 36 are mounted upon a base 73 adjustably supported upon the end of an arm 70 which is bent downwardly at its outer extremity for its adjustable connection with a clamp 71 by which it is secured to a bracket 72.

This form of the instrument adapts it for connection independent of a trial-frame such as shown in Figs. 1 and 2, on either a wall, a standard, an operating chair or other suitable support.

The connection between the base 73 and the arm 70, is established through the medium of a foot 75 which is pivotally connected with the base as at 76 and which is mounted upon an enlargement 81 at the end of the arm, to move about a vertical axis. A tongue 77 depending from the base 73 extends between a screw 78 and a spring-pressed follower 79 on the foot 75 for the micrometric adjustment of the instrument, and a spirit level 80 on the base is provided to indicate the proper position of the instrument relative to the horizontal.

Having thus described my invention what I claim and desire to secure by Letters-Patent is:

1. A dynamic optometer comprising a movable test-type bearing carrier, a reflector on said carrier, and a stationary reflector which are relatively disposed to reflect a test-type of the carrier, said carrier being mounted for movement in a determinate path to vary the distance between said reflectors, and means for effecting said movement.

2. A dynamic optometer comprising a movable test-type bearing carrier, a reflector on said carrier, and a stationary reflector which are relatively disposed to reflect a test-type of the carrier, said carrier being mounted for movement in a determinate path to vary the distance between said reflectors, and a flexible tape connected with the carrier and mounted to effect the movement thereof, by its movement relative to a fixed point.

3. A dynamic optometer comprising a movable test type bearing carrier, a reflector on said carrier and a stationary reflector which are relatively disposed to reflect a test-type of the carrier, said carrier being mounted for movement in a determinate path to vary the distance between said reflectors, means for effecting said movement, and mechanism for locking the carrier in a selected position against movement by the operation of said means.

4. A dynamic optometer comprising a movable test-type bearing carrier, a reflector on said carrier, and a stationary reflector which are relatively disposed to reflect a test-type of the carrier, said carrier being mounted for movement in a determinate path to vary the distance between said reflectors, a measuring tape connected with the carrier and mounted to effect the movement thereof by its movement relative to a fixed point, and mechanism adapted to lock the carrier in a selected position and to simultaneously disconnect the same from the tape.

5. A dynamic optometer comprising a movable test-type bearing carrier, a lamp on said carrier to illuminate a test-type thereof, a reflector on the carrier, and a stationary reflector which are relatively disposed to reflect said test-type, said carrier being mounted for movement in a determinate path to vary the distance between said reflectors, and means for effecting said movement.

6. A dynamic optometer comprising a movable test-type bearing carrier, a reflector on said carrier, and a stationary reflector which are relatively disposed to reflect a test-type of the carrier, said carrier being mounted for movement in a determinate path to vary the distance between said reflectors, a fixed pointer, and a therewith coöperative measuring tape connected with the carrier and mounted to effect the movement thereof by its movement relative to said pointer.

7. A dynamic optometer comprising a movable test-type bearing carrier, a reflector on said carrier, and a stationary reflector which are relatively disposed to reflect a test-type of the carrier, said carrier being mounted for movement in a determinate path to vary the distance between said reflectors, a fixed pointer, a therewith coöperative measuring tape connected with the carrier and mounted to effect the movement thereof by its movement relative to said pointer, and a lamp illuminating the portion of the tape which registers with the pointer.

8. A dynamic optometer comprising a movable carrier, a rotary member thereon, bearing a series of consecutively arranged test-types, a reflector disposed on said carrier to reflect said test-types singly at a determinate point in the movement of said member, a stationary reflector disposed to reflect the image produced in the first reflector, said carrier being mounted for movement in a determinate path to vary the distance between said reflectors, means for effecting said movement, and mechanism to effect a partial rotation of said member at determinate points in the movement of the carrier, to move its test-types successively into the field of the reflectors.

9. A dynamic optometer comprising an upright column, a test-type bearing carrier slidable thereon, a reflector on said carrier, and a stationary reflector which are relatively disposed to reflect a test-type of said carrier, and means for effecting a sliding movement of the carrier along the column to vary the distance between the reflectors.

10. A dynamic optometer comprising an upright column, a test-type bearing carrier slidable thereon, a reflector on said carrier and a stationary reflector which are relatively disposed to reflect a test-type of the carrier, a trial-frame opposite said stationary reflector, and means for effecting a sliding movement of the carrier along the column to vary the distance between the reflectors.

11. A dynamic optometer comprising an upright column, a test-type bearing carrier slidable thereon, a reflector on said carrier and a stationary reflector which are relatively disposed to reflect said test-type, a pair of sheaves, and a tape connected with the carrier and trained over said sheaves, to slide by its movement relative to a fixed point, the carrier along the column to vary the distance between the reflectors.

12. A dynamic optometer comprising an upright column, a test-type bearing carrier slidable thereon, a reflector on said carrier and a stationary reflector which are relatively disposed to reflect a test-type on the carrier, a pair of sheaves, a stationary pointer, and a therewith coöperative measuring tape connected with the carrier and trained over said sheaves to slide by its movement relative to the pointer, the carrier along the column to vary the distance between the reflectors.

13. A dynamic optometer comprising an upright column, a test-type bearing carrier slidable thereon, a reflector on said carrier and a stationary reflector which are relatively disposed to reflect a test-type of said carrier, a pair of sheaves, a spring-controlled reel, and a tape on said reel connected with the carrier and trained over said sheaves to slide by its movement relative to a fixed point, the carrier along the column and thereby vary the distance between the reflectors.

14. A dynamic optometer comprising an upright column, a test-type bearing carrier slidable on said column, a reflector on said carrier and a stationary reflector which are relatively disposed to reflect a test-type of the carrier, means for effecting a sliding movement of the carrier along the column to vary the distance between the reflectors, and a third reflector adjustable to a position between the first-mentioned reflectors, for coöperation with the stationary reflector.

15. A dynamic optometer comprising a movable casing having a sight-opening, a rotary member in said casing bearing a series of consecutively arranged test-types adapted to register with said sight-opening, a reflector disposed on said casing to reflect the test-type registering with said opening, a stationary reflector disposed to reflect the image produced in the first reflector, said casing being mounted for movement in a determinate path to vary the distance between the reflectors, means to effect said movement, and mechanism to effect a partial rotation of said member at determinate points in the movement of the element, to move its test-types successively into register with said opening.

16. A dynamic optometer comprising a movable casing having two sight-openings, a rotary member in said casing bearing a series of consecutively arranged test-types and a correspondingly arranged series of identification-marks respectively registering with said openings, a reflector disposed to reflect the test-types registering with one of said openings, a reflector disposed on said casing to reflect the test-type registering with said opening, a stationary reflector disposed to reflect the image produced in the first reflector, said casing being mounted for movement in a determinate path to vary the distance between the reflectors, means to effect said movement, and mechanism to effect a partial rotation of said member at determinate points in the movement of the element, to move its test types and identification marks successively into register with the respective openings.

17. A dynamic optometer comprising a movable carrier, a rotary member thereon, bearing a series of consecutively arranged test-types, a reflector disposed on said carrier to reflect said test-types singly at a determinate point in the movement of said member, a stationary reflector disposed to reflect the image produced in the first reflector, said carrier being mounted for movement in a determinate path to vary the distance between said reflectors, means for effecting said movement, mechanism to effect a partial rotation of said member at determinate points in the movement of the carrier, to move its test-types successively into the field of the reflectors, and a device adapted to render said mechanism inoperative whereby to discontinue the intermittent rotations of the member during movement of the carrier.

18. A dynamic optometer comprising a movable carrier, a rotary member thereon, bearing a series of consecutively arranged test-types, a reflector disposed on said carrier to reflect said test-types singly at a determinate point in the movement of said member, a stationary reflector disposed to reflect the image produced in the first reflector, said carrier being mounted for movement in a determinate path to vary the distance between said reflectors, means for effecting said movement, a transmission mechanism for the operation of said member, and a fixed actuative medium coöperative with said mechanism to impart a partial rotation to the member at determinate points in the movement of the carrier, whereby to move its test-types successively into the field of the reflectors.

19. A dynamic optometer comprising a movable carrier, a rotary member thereon, bearing a series of consecutively arranged test-types, a reflector disposed on said carrier to reflect said test-types singly at a determinate point in the movement of said member, a stationary reflector disposed to reflect the image produced in the first reflector, said carrier being mounted for movement in a determinate path to vary the distance between said reflectors, a pointer, a therewith coöperative measuring tape connected with said carrier and mounted to effect the movement thereof by its movement relative to said pointer, and mechanism to effect a partial rotation of said member at determinate points in the movement of the carrier, to move its test-types successively into the field of the reflectors.

20. A dynamic optometer comprising a movable carrier, a rotary member thereon, bearing a series of consecutively arranged test-types, a reflector disposed on said carrier to reflect said test-types singly at a determinate point in the movement of said member, a stationary reflector disposed to reflect the image produced in the first reflector, said carrier being mounted for movement in a determinate path to vary the distance between said reflectors, means for effecting said movement, a transmission mechanism for the operation of said member, a fixed actuative medium coöperative with said mechanism to impart a partial rotation to the member at determinate points in the movement of the carrier, whereby to move its test-types successively into the field of the reflectors, and an adjustable device to interrupt the coöperative relation of said mechanism to said medium, whereby to discontinue the rotation of the member during movement of the carrier.

21. A dynamic optometer comprising a movable carrier, a rotary member thereon, bearing a series of consecutively arranged test-types, a reflector disposed on said carrier to reflect said test-types singly at a determinate point in the movement of said member, a stationary reflector disposed to reflect the image produced in the first reflector, said carrier being mounted for movement in a determinate path to vary the distance between said reflectors, means for effecting said movement, a transmission mechanism for the operation of said member, a fixed actuative medium coöperative with said mechanism to impart a partial rotation to the member at determinate points in the movement of the carrier, whereby to move its test-types successively into the field of the reflectors, and an adjustable device controlling the coöperative relation of said mechanism and said medium, and the connection of the carrier with its operating means.

22. A dynamic optometer comprising a movable carrier, a rotary member thereon, bearing a series of consecutively arranged test-types, a reflector disposed on said carrier to reflect said test-types singly at a determinate point in the movement of said member, a stationary reflector disposed to reflect the image produced in the first reflector, said carrier being mounted for movement in a determinate path to vary the distance between said reflectors, means for effecting said movement, a transmission mechanism for the operation of said member, a fixed actuative medium coöperative with said mechanism to impart a partial rotation to the member at determinate points in the movement of the carrier, whereby to move its test-types successively into the field of the reflectors, and an adjustable device controlling the coöperative relation of said mechanism and said medium, and the connection of the carrier with its operating means, and adapted to lock the carrier in a selected position in the path in which it has its movement.

23. A dynamic optometer comprising an upright column, a carrier slidable on said column, a rotary disk on said carrier, bearing a series of successively arranged test-types, a reflector disposed on said carrier to reflect said test-types singly at a determinate point in the movement of the disk, a stationary reflector disposed to reflect the image produced in the first reflector, a winding-tape mounted to move the carrier along the column, an actuating device extending along said column, and transmission mechanism on the carrier coöperating with said device to impart a partial rotation to the disk at determinate points in the movement of the carrier.

24. A dynamic optometer comprising an upright column, a carrier slidable on said column, a rotary disk on said carrier, bearing a series of successively arranged test-types, a reflector disposed on said carrier to reflect said test-types singly at a determinate point in the movement of the disk, a stationary reflector disposed to reflect the image produced in the first reflector, a winding tape mounted to move the carrier along the column, a series of tappets extending at intervals in a line parallel to that of the movement of the carrier along the column, and a transmission-member on the carrier in driving connection with said disk, and including a cam-wheel coöperative with said tappets.

25. A dynamic optometer comprising an upright column, a carrier slidable on said column, a rotary disk on said carrier, bearing a series of successively arranged test-types, a reflector disposed on said carrier to reflect said test-types singly at a determinate point in the movement of the disk, a stationary reflector disposed to reflect the image produced in the first reflector, a winding tape mounted to move the carrier along the column, a rib on the column having a series of tappets, a transmission-member on the carrier in driving connection with said disk and including a cam-wheel coöperative with said tappets, a latch adapted to lock the carrier against movement by engagement with said rib, and a switch on the carrier, controlling the operation of said latch.

26. A dynamic optometer comprising an upright column, a carrier slidable on said column, a rotary disk on said carrier, bearing a series of successively arranged test-types, a reflector disposed on said carrier to reflect said test-types singly at a determinate point in the movement of the disk, a stationary reflector disposed to reflect the image produced in the first reflector, a winding tape mounted to move the carrier along the column, a rib on the column having a series of tappets, an adjustable transmission member on the carrier, in driving connection with said disk and including a cam-wheel coöperative with said tappets, and a switch on the carrier controlling the operative position of said member.

27. A dynamic optometer comprising an upright column, a carrier slidable on said column, a rotary disk on said carrier, bearing a series of successively arranged test-types, a reflector disposed on said carrier to reflect said test-types singly at a determinate point in the movement of the disk, a stationary reflector disposed to reflect the image produced in the first reflector, a winding tape mounted to move the carrier along the column, a rib on the column, having a series of tappets, an adjustable transmission member on the carrier, in driving connection with said disk and including a cam-wheel coöperative with said tappets, a latch adapted to lock the carrier against movement by engagement with said rib, and a switch on the carrier controlling the operative position of said member and the operation of the latch.

28. A dynamic optometer comprising an upright column, a carrier slidable on said column, a rotary disk on said carrier, bearing a series of successively arranged test-types, a reflector disposed on said carrier to reflect said test-types singly at a determinate point in the movement of the disk, a stationary reflector disposed to reflect the image produced in the first reflector, a winding tape mounted to move the carrier along the column, a grip to establish a connection between the carrier and the tape, a rib on the column having a series of tappets, an adjustable transmission member on the carrier in driving connection with said disk and including a cam-wheel coöperative with said tappets, a latch adapted to lock the carrier against movement by engagement with said rib, and a switch on the carrier controlling the operative position of said member and the operation of the latch and the grip.

29. A dynamic optometer comprising an upright column, a carrier slidable on said column, a rotary disk on said carrier, bearing a series of successively arranged test-types, a reflector disposed on said carrier to reflect said test-types singly at a determinate point in the movement of the disk, a stationary reflector disposed to reflect the image produced in the first reflector, a winding tape mounted to move the carrier along the column, a grip to establish a connection between the carrier and the tape, a rib on the column having a series of tappets, an adjustable transmission member on the carrier in driving connection with said disk and including a cam-wheel coöperative with said tappets, and a switch on the carrier controlling the operative position of said member and the operation of the grip.

30. A dynamic optometer comprising an upright column, a carrier slidable on said column, a rotary disk on said carrier bearing a series of successively arranged test-types, a reflector disposed on said carrier to reflect said test-types singly at a determinate point in the movement of the disk, a stationary reflector disposed to reflect the image produced in the first reflector, a winding tape mounted to move the carrier along the column, a grip to establish a connection between the carrier and the tape, a rib on the column having a series of tappets, a transmission member on the carrier in driving connection with said disk and including a cam-wheel coöperative with said tappets, a latch adapted to lock the carrier against movement by engagement with said rib, and a switch on the carrier controlling the operation of the latch and the grip.

31. A dynamic optometer comprising a carrier mounted to move in a determinate path, a rotary disk on said carrier bearing a series of consecutively arranged test-types, mechanism to expose said test-types singly at predetermined points in the movement of the carrier in said path, a pointer, and a measuring tape mounted to move said carrier, by its movement with relation to said pointer.

32. A dynamic optometer comprising an upright column, a test-type bearing carrier slidable thereon, a reflector on said carrier and a stationary reflector which are relatively disposed to reflect a test-type of the carrier, a pair of sheaves, a tape trained over said sheaves and connected with the carrier to effect its movement along the column, and a guide positioned at a distance from said column to guide the tape against lateral deflection.

33. A dynamic optometer comprising an upright column, a counterbalanced test-type bearing carrier slidable thereon, a reflector on said carrier and a stationary reflector which are relatively disposed to reflect a test-type of the carrier, and means for effecting a sliding movement of the carrier along the column to vary the distance between the reflectors.

34. A dynamic optometer comprising an upright column, a test-type bearing carrier slidable thereon, a reflector on said carrier and a stationary reflector which are relatively disposed to reflect a test-type of the carrier, means for effecting a sliding movement of the carrier along the column to vary the distance between the reflectors, and a spring reel counterbalancing the weight of the sliding carrier.

35. A dynamic optometer comprising a base, a column thereon, a test-type bearing carrier slidable on said column, a reflector on said carrier, and a reflector supported on the base, which are relatively disposed to reflect a test type of the carrier, and a bracket upon which said base is adjustably supported.

36. A dynamic optometer comprising a base, a column thereon, a test-type bearing carrier slidable on said column, a reflector on said carrier and a reflector supported on the base, which are relatively disposed to reflect a test type of the carrier, a bracket upon which said base is adjustably supported, and means for the micrometric adjustment of the base.

37. A dynamic optometer comprising an upright column, a test-type bearing carrier slidable thereon, a reflector on said carrier and a stationary reflector relatively disposed for the reflection of a test-type on the carrier, a winding tape mounted to move the carrier along the column, a grip adapted to establish a connection between the carrier and the tape, and means for locking the carrier in a selected position on the column by the movement of the grip to a position in which it releases the tape.

38. A dynamic optometer comprising a carrier having a sight-opening and mounted to move in a determinate path, a rotary element on the carrier, bearing a series of consecutive test-types opposite the sight-opening, means to effect a movement of the carrier whereby to vary its distance from a given point, and mechanism coöperative with said means to intermittently rotate the carrier whereby to bring its types successively in register with the sight-opening.

39. A dynamic optometer comprising a carrier having a sight-opening and mounted to move in a determinate path, a rotary element on the carrier, bearing a series of consecutive test-types opposite the sight-opening, means to effect a movement of the carrier whereby to vary its distance from a given point, and mechanism coöperative with said means to intermittently rotate the carrier at predetermined distances from said point whereby to bring its type successively in register with the sight-opening.

40. A dynamic optometer comprising a member having a sight-opening, a rotary member bearing a series of test-types of graduated sizes, adapted to be brought successively in register with said opening by the movement of the member, connecting means which permit of the instrument being moved in a straight line with relation to a given point, and mechanism coöperative with said means for effecting an intermittent rotation of the test-type bearing member by said movement of the instrument.

41. A dynamic optometer comprising a carrier, a movable series of test-types thereon, mechanism for moving said series for their separate exposure, and a tape having means coöperative with the mechanism to actuate the same at determinate points in a movement of the carrier with relation to a point at which the tape is fastened.

In testimony whereof I have affixed my signature in presence of two witnesses.

CHARLES E. H. ARMBRUSTER.

Witnesses:
L. RHOADES,
F. H. CUNO.

Copies of this patent may be obtained for five cents each, by addressing the "Commissioner of Patents, Washington, D. C."